United States Patent
Pekkala et al.

(10) Patent No.: US 8,037,297 B2
(45) Date of Patent: Oct. 11, 2011

(54) NETWORK AND NODE FOR PROVIDING A SECURE TRANSMISSION OF MOBILE APPLICATION PART MESSAGES

(75) Inventors: Reijo Pekkala, Espoo (FI); Juha Saaskilahti, Espoo (FI); Karl-Johan Wiren, Vanda (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1237 days.

(21) Appl. No.: 10/595,447

(22) PCT Filed: Oct. 20, 2003

(86) PCT No.: PCT/EP03/11609
§ 371 (c)(1),
(2), (4) Date: Feb. 22, 2007

(87) PCT Pub. No.: WO2005/043859
PCT Pub. Date: May 12, 2005

(65) Prior Publication Data
US 2007/0127418 A1    Jun. 7, 2007

(51) Int. Cl.
*H04L 9/00* (2006.01)
*G06F 7/04* (2006.01)
*G06F 17/00* (2006.01)

(52) U.S. Cl. ........ 713/151; 713/152; 713/153; 713/154; 726/11; 726/12; 726/13; 726/14

(58) Field of Classification Search .................... 713/151
See application file for complete search history.

(56) References Cited

U.S. PATENT DOCUMENTS

| | | | |
|---|---|---|---|
| 6,327,267 B1 * | 12/2001 | Valentine et al. | 370/466 |
| 7,536,183 B2 * | 5/2009 | Loganathan et al. | 455/432.2 |
| 2002/0052200 A1 * | 5/2002 | Arkko et al. | 455/432 |

FOREIGN PATENT DOCUMENTS

| | | |
|---|---|---|
| WO | WO 02 11395 A | 2/2002 |
| WO | WO 02/11395 A2 * | 2/2002 |
| WO | WO 0211395 | 2/2002 |

OTHER PUBLICATIONS

"3GPP TS 33.200 V5.0.0 Release 5" Mar. 2002.*

* cited by examiner

*Primary Examiner* — Longbit Chai

(57) ABSTRACT

According to the present invention a telecommunication network with a first domain (PLMN-A) comprising at least one mobile application part protocol instance is connected to a gateway node (MSEGA) which is adapted to send and receive mobile application part messages and which is connectable to a second domain. The telecommunication network is remarkable in that the gateway node (MSEGA) is adapted to receive a mobile application part message from the first domain, to convert the received mobile application part message obtaining a secured mobile application part message, and to send the obtained message to the second domain. The gateway node (MSEGA) is further adapted to receive a secured mobile application part message from the second domain, to extract an unsecured mobile application part message from the received secured mobile application part message and to send the extracted message to the first domain.

10 Claims, 3 Drawing Sheets

NETWORK AND NODE FOR PROVIDING A SECURE TRANSMISSION OF MOBILE APPLICATION PART MESSAGES

FIELD OF INVENTION

The invention relates to a network and a node for providing a secure transmission of mobile application part messages.

DESCRIPTION OF PRIOR ART

The invention is related to a protocol layer for encrypting and decrypting messages according to the mobile application part (MAP) protocol. The MAP protocol is an application protocol in the protocol stack according to the signaling system number 7 (SS7). The MAP protocol that has been developed for mobile networks according to the Global System for Mobile Communications (GSM) standard. The MAP protocol is used for querying databases in GSM networks, such as a Visitor Location Register (VLR) or a Home Location Register (HLR). The transmission of MAP messages can be secured by an encrypting of a MAP message at a sending node and a decrypting of a MAP message in a receiving node. Encrypting and decrypting of MAP messages is part of a MAP application layer security that is described in the technical specification (TS) 33.200 of the third generation partnership project (3GPP).

Currently the need to secure the transmission of MAP messages has become prominent in networks which are commonly used by operators among which a relationship of trust has not yet been developed to a full extend.

According to the state of the art a unit for encrypting and decrypting MAP messages and a MAP protocol instance are implemented on a common physical node. This is not flexible and this is related to large implementation costs if the MAP application layer security is introduced in a network comprising a large number of different network nodes.

OBJECT OF THE INVENTION

Therefore it is object of the invention to overcome the shortcomings of the state of the art and to provide a flexible and cost-efficient implementation of the MAP application layer security.

SUMMARY OF THE INVENTION

This object is solved by the method of claim 1. The invention is also embodied in a gateway node according to claim 7. Advantageous embodiments are described in the dependent claims.

According to the present invention a telecommunication network with a first domain comprises at least one mobile application part protocol instance connected to a gateway node which is adapted to send and receive mobile application part messages and which is connectable to a second domain. The telecommunication network is remarkable in that the gateway node is adapted to receive a mobile application part message from the first domain, to convert the received mobile application part message obtaining a secured mobile application part message, and to send the obtained message towards the second domain. The gateway node is further adapted to receive a secured mobile application part message from the second domain, to extract an unsecured mobile application part message from the received secured mobile application part message and to send the extracted message towards the first domain.

This provides a flexible method to implement mobile application part application layer security, as a further mobile application part protocol instance can be easily added to the first domain. Further a cost efficient implementation of mobile application part application layer security is provided for a first domain comprising different kinds of network nodes on which the mobile application part protocol is implemented.

In a further embodiment of the telecommunication network the gateway node is connectable to a third domain and the gateway node performs a selective discarding of mobile application part messages received from the first domain and destined for the third domain and a selective discarding of mobile application part messages received from the third domain and destined for the first domain.

By this a secured communication is provided by the gateway node towards different domains. Also a basic level of security can be provided by the gateway node if unencrypted messages are transmitted in the third domain.

In another embodiment of the telecommunication network, the gateway node performs as a firewall towards the third domain.

In an advantageous embodiment of the telecommunication network the gateway node is connectable to different domains, and levels of security are configurable for the different domains. By this a secure communication can be provided by the gateway node in a flexible way.

In an advantageous embodiment of the telecommunication network a level of security is configurable for one domain independently from a configuring of a level of security for another domain. By this a secure communication can be provided by the gateway node in a flexible way.

In a further advantageous embodiment of the telecommunication network for a particular domain a fallback to a lower level of security than the configured level of security for the particular domain is allowable and the allowing of the fallback to the lower level of security is configurable for one domain independently from a configuring of an allowing of a respective fallback to a lower level of security level for another domain.

By this a fallback to a lower level of security can be allowed according to a level of trust towards a domain. This provides a flexible and secure way to connect the first domain to different other domains of the telecommunication networks.

In another embodiment of the invention a gateway node comprises an interface to a first domain of a telecommunication network for sending and receiving mobile application part messages. The gateway node is remarkable in that it comprises an interface to a second domain of the telecommunication network for sending and receiving secured mobile application part messages. The gateway node further comprises a conversion unit that is adapted to receive a mobile application part message via the interface to the first domain, to convert the received mobile application part message obtaining a secured mobile application part message, and to send the obtained message via the interface towards the second domain. The conversion unit is further adapted to receive a secured mobile application part message via the interface to the second domain, to extract an unsecured mobile application part message from the received secured mobile application part message and to send the extracted message via the interface towards the first domain.

This provides a flexible method to implement mobile application part application layer security, as a further mobile application part protocol instance can be easily added to the first domain. Further a cost efficient implementation of mobile application part application layer security is provided for a first domain comprising different kinds of network nodes on which the mobile application part protocol is implemented.

In a further embodiment of the gateway node, the gateway node comprises an interface to a third domain for sending and receiving mobile application part messages and a filtering unit adapted to perform a selective discarding of mobile application part messages.

By this a secured communication is provided by the gateway node towards different domains. Also a basic level of security can be provided by the gateway node if unencrypted messages are transmitted in the third domain.

In another advantageous embodiment of the gateway node the gateway node performs as a firewall towards the third domain.

In a further advantageous embodiment of the gateway node, the gateway node is connectable to different domains, and the gateway node comprises a security database for storing indications of levels of security for the different domains. By this a secure communication can be provided by the gateway node in a flexible way.

In another advantageous embodiment of the gateway node, a level of security is configurable for one domain independently from a configuring of a level of security for another domain. By this a secure communication can be provided by the gateway node in a flexible way.

In a further advantageous embodiment of the gateway node, the gateway node comprises a fallback store for storing for a particular domain an indication that a fallback to a lower level of security than the configured level of security for the particular domain is allowable and the allowing of the fallback to the lower level of security is configurable for one domain independently from an allowing of a respective fallback to a lower level of security for another domain.

By this a fallback to a lower level of security can be allowed according to a level of trust towards a domain. This provides a flexible and secure Way to connect the first domain to different other domains of the telecommunication network.

DETAILED DESCRIPTION OF EMBODIMENTS

In the following the invention is described in more detail by means of embodiments and figures. Equal reference signs indicate equal elements.

Figure 1:
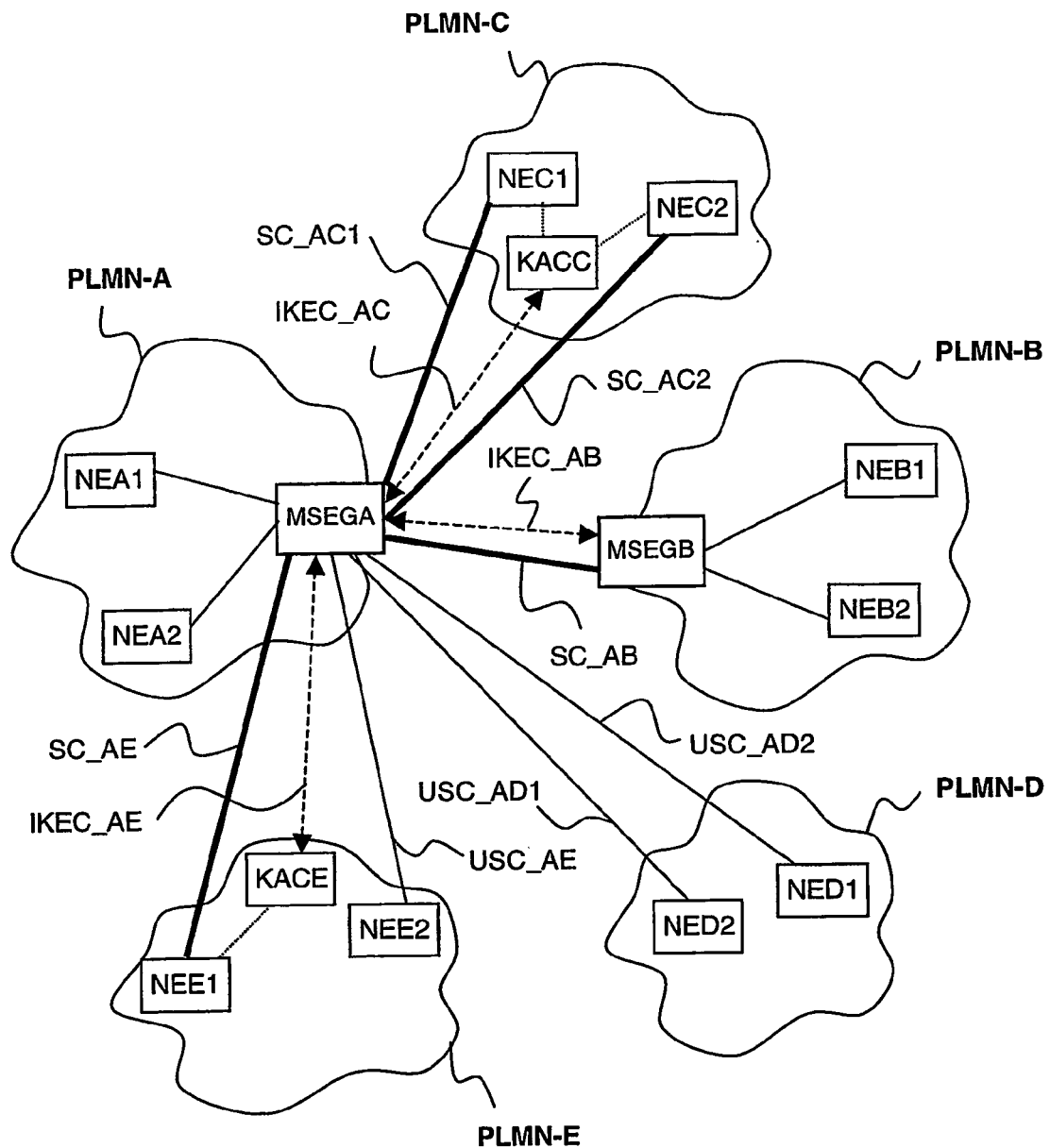
FIG. 1 depicts a telecommunication communication network providing a transmission of mobile application part messages between a first domain and further domains, in which different kinds of security mechanisms are provided

FIG. 1 depicts a telecommunication network comprising a first domain PLMN-A, a second domain PLMN-B, a third domain PLMN-E, a fourth domain PLMN-C, and a fifth domain PLMN-D. A domain can be e.g. a sub-network and the different domains can be sub-networks operated by different network operators.

The different domains of the telecommunication network comprise network nodes on which protocol instances of the MAP (mobile application part) protocol are implemented. Communication channels between network nodes that are secured in that MAP messages are transmitted as MAP security messages are depicted as continuous thick lines. Communication channels between network nodes via which mobile application part messages are transmitted as unsecured messages are depicted as continuous thin lines. Connections for exchanging keys for encryption or decryption and other kinds of security information used for a mobile application part transport layer security are depicted as dashed double-headed arrows. Connections for providing security information by a security database to a network node on which a mobile application part protocol instance is implemented are depicted as dotted lines.

The first domain PLMN-A comprises a first and a second network node NEA1 and NEA2 on which MAP protocol instances are installed. The first domain PLMN-A is regarded as a secure domain of the telecommunication network. Therefore no encryption is applied to the MAP messages and unencrypted MAP messages can be exchanged by the MAP protocol instances within the first domain PLMN-A.

To provide a connecting of the MAP protocol instances in the first domain PLMN-A to other MAP protocol instances in the other domains of the telecommunication network, the first and the second network node NEA1 and NAE2 are connectable to other network nodes via a first gateway node MSEGA. MAP messages from MAP protocol instances in the first domain PLMN-A to MAP protocol instances in the other domains are routed within the first domain PLMN-A towards the first gateway node MSEGA. Accordingly encrypted MAP messages and unencrypted MAP messages from other domains are routed towards the MAP protocol instances in the first domain via the first gateway node MSEGA.

The first gateway node MSEGA provides an encrypting of MAP messages received from protocol instances within the first domain PLMN-A wherein the encrypting complies with the MAP application layer security. Encrypted messages obtained by said encrypting comply with the MAP application layer security. Accordingly the first gateway node MSEGA provides a decrypting of secured MAP messages the content of which is destined to MAP protocol instances in the first domain PLMN-A and that are received from domains of the telecommunication network other than the first domain PLMN-A. Decrypted messages obtained by said decrypting comply with the MAP protocol.

In an advantageous embodiment of the first gateway node MSEGA the first gateway node MSEGA comprises a security database storing and providing security information used for the encryption of MAP messages and the decryption of secured MAP messages. Such security information comprises keys for encrypting MAP massages, keys for decrypting secured MAP messages and security policies to be applied. To provide an exchanging of said security information the first gateway node MSEGA is connected to other databases storing and providing security information. In particular the security database within the first gateway node MSEGA is connected to a security database in a second gateway node MSEGB via a first security information exchange connection IKEC_AB. Moreover the security database within the first gateway node MSEGA is connected to a first security database KACC in the fourth domain PLMN-C via a second security information exchange connection IKEC_AC and to a second security database KACE in the third domain PLMN-E via a third security information exchange connection IKEC_AE.

The second domain PLMN-B comprises a third and a fourth network node NEB1 and NEB2, that are connected to the first and the second network node NEA1 and NEA2 in the first domain PLMN-A via the second gateway node MSEGB. The third and the fourth network node NEB1 and NEB2 each comprise MAP protocol instances. The second domain PLMN-B is regarded as a secure domain of the telecommunication network. Therefore no encryption is applied to the MAP messages within the second domain and unencrypted MAP messages can be exchanged by the MAP protocol instances within the second domain PLMN-B. A transmission of secured MAP messages between the first gateway node MSEGA and the second gateway node MSEGB is provided for by the first secured transmission channel SC_AB.

MAP messages from the second domain PLMN-B to other domains are routed via the second gateway node MSEGB and secured MAP messages towards the second domain PLMN-B are accordingly routed via the second gateway node MSEGB. As a transmission of unencrypted messages between the first and the second domain PLMN-A and PLMN-B is not regarded as secure, MAP messages between the first and the second domain PLMN-A and PLMN-B are transmitted as encrypted MAP messages via the first secured transmission channel SC_AB. Therefore a MAP message form a protocol instance in the first domain PLMN-A to a protocol instance in the second domain PLMN-B is routed in the first domain PLMN-A towards the first gateway node MSEGA. The MAP message is received in the first gateway node MSEGA, encrypted applying encryption complying with the MAP application layer security and sent as encrypted MAP message via the first secured transmission channel SC_AB to the second gateway node MSEGB within the second domain PLMN-B. The encrypted MAP message is decrypted in the second gateway node MSEGB obtaining a MAP message comprising the content of the original MAP message sent in the first domain PLMN-A. The obtained MAP message is routed in the second domain PLMN-B towards a MAP protocol instance terminating the MAP message.

Accordingly a MAP message from a MAP protocol instance in the second domain PLMN-B and destined for a MAP protocol instance in the first domain PLMN-A is routed in the second domain PLMN-B towards the second gateway node MSEGB, encrypted obtaining a secured MAP message which is transmitted via the first secured transmission channel SC_AB to the first gateway node MSEGA in the first domain PLMN-A. In the first gateway node MSEGA the secured MAP message is decrypted obtaining a MAP message comprising the content of the original MAP message sent in the second domain PLMN-B. The obtained MAP message is routed in the first domain PLMN-A towards a destination MAP protocol instance that terminates the MAP message.

The fourth domain PLMN-C of the telecommunication network comprises a fifth and a sixth network node NEC1 and NEC2, on each of which a MAP protocol instance and a conversion unit for MAP message encryption and decryption are installed. The MAP protocol instance in the fifth and the sixth network node NEC1 and NEC2 respectively are connected to the first gateway node MSEGA via a second and a third secured transmission channel SC_AC1 and SC_AC2 respectively. The fourth domain PLMN-C further comprises a first security database KACC storing and providing security information used for the encryption of MAP messages and the decryption of secured MAP messages. The first security database KACC provides security information to the conversion units in the fifth and the sixth network node NEC1 and NEC2. To provide an exchanging of security information the first security database KACC is connected to the security database in the first gateway node MSEGA via a second security information exchange connection IKEC_AC.

Either the transmission of unencrypted MAP messages in the fourth domain PLMN-C or the transmission of unencrypted MAP messages from the fourth domain PLMN-C to other domains e.g. to the first domain PLMN-A is not regarded secure. MAP messages between MAP protocol instances in the first domain PLMN-A and MAP protocol instances in the fourth domain PLMN-C are therefore encrypted and transmitted as secured MAP messages. Message encryption and decryption for the MAP protocol instances in the fifth and the sixth network node NEC1 and NEC2 is performed by the respective conversion units in the fifth and the sixth network node NEC1 and NEC2 respectively. The transmission of secured MAP messages between the first and the fourth domain, PLMN-A and PLMN-C shows that the invented solution is compatible with the implementation of MAP application layer security according to the state of the art, in which a conversion unit for MAP message encryption and decryption is provided for every MAP protocol instance.

In the following the encryption and decryption of MAP messages between the fourth and the first domain PLMN-C and PLMN-A shall be described by the example of the MAP protocol instances in the first and the fifth network node NEA1 and NEC1. A MAP message from the MAP protocol instance in the fifth network node NEC1 destined to the MAP protocol instance in the first network node NEA1 is forwarded in the fifth network node NEC1 to the conversion unit in the fifth network node NEC1 and encrypted obtaining a secured MAP message. The obtained secured MAP message is sent via the second secured transmission channel SC-AC1 to the first gateway node MSEGA. The encrypted MAP messages is decrypted in the first gateway node MSEGA obtaining a MAP message comprising the content of the original MAP message sent by the MAP protocol instance in the fifth network node NEC1. The obtained MAP message is routed in the first domain towards the MAP protocol instance in the first network node NEA1 terminating the MAP message.

Accordingly a MAP message from the MAP protocol instance in the first network node NEA1 destined for the MAP protocol instance in the fifth network node NEC1 is routed in the first domain PLMN-A towards the first gateway node MSEGA and encrypted obtaining a secured MAP message. The obtained secured MAP message is transmitted via the second secured transmission channel SC_AC1 to the conversion unit in the fifth network node NEC1. The conversion unit in the fifth network node NEC1 decrypts the received secured MAP message obtaining a MAP message that comprises the content of the original MAP message sent in the first domain PLMN-A. The obtained MAP message is handed over by the conversion unit in the fifth network node NEC1 to the MAP protocol instance in the fifth network node NEC1.

The fifth domain PLMN-D of the telecommunication network comprises a seventh and an eighth network node NED1 and NED2, on each of which a MAP protocol instance is installed. The seventh and the eighth network node NED1 and NED2 are connected to the first gateway node MSEGA in the first domain PLMN-A via a first and a second unsecured communication channel USC_AD1 and USC_AD2. To provide a basic level of security, the first gateway node MSEGA performs a selective discarding of MAP messages received from the first domain PLMN-A and destined for the fifth domain PLMN-D and a selective discarding of mobile application part messages received from the fifth domain PLMN-D and destined for the first domain PLMN-A. In an advantageous embodiment the selective discarding is based on an address in a MAP message or a type of a MAP message. The selective discarding can be implemented in that the first gateway node MSEGA performs as a firewall towards the fifth domain PLMN-D.

The third domain PLMN-E of the telecommunication network comprises a ninth network node NEE1 on which a MAP protocol instance and a conversion unit for MAP message encryption and decryption are installed and a tenth network node NEE2, on which a MAP protocol instance is installed. The ninth network node NEE1 is connected to the first gateway node MSEGA via fourth secure communication channel SC_AE, for which security information is provided by a third security database KACE and exchanged between the third security database KACE and the security database in the first gateway node MSEGA via a third security information exchange connection IKEC_AE. The tenth network node NEE2 is connected to the first gateway node MSEGA in the first domain PLMN-A via a third unsecured communication channel USC_AE. To provide a basic level of security for unencrypted MAP messages exchanged between the first gateway node MSEGA and network nodes in the third domain PLMN-E the first gateway node MSEGA performs a selective discarding of MAP messages towards the third domain PLMN-E. As described for the MAP messages towards the fifth domain PLMN-D, the selective discarding can be based on an address or a type of a MAP message and the selective discarding can be implemented in that the first gateway node MSEGA performs as a firewall towards the third domain PLMN-E.

Figure 2:
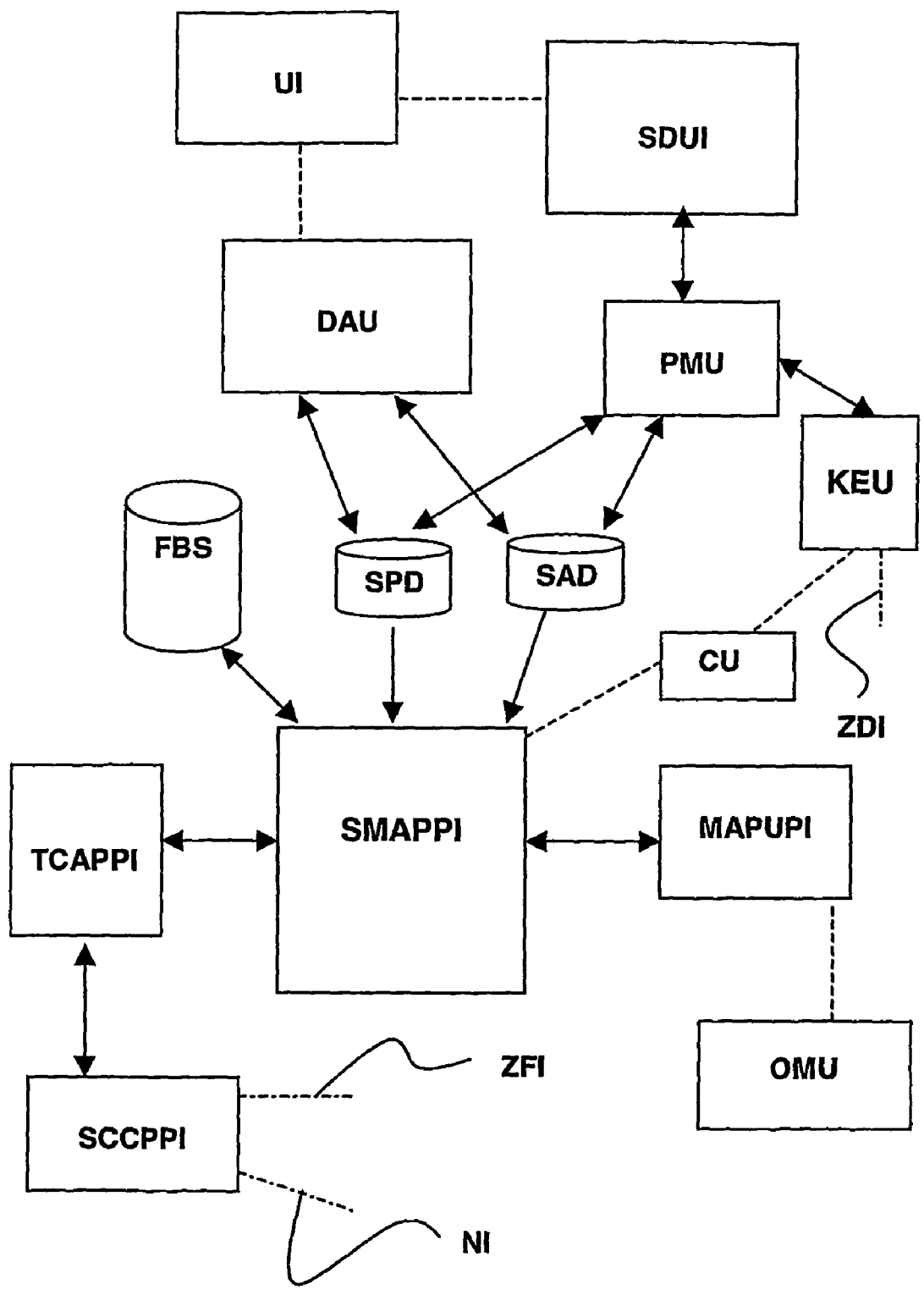
FIG. 2 depicts an architecture of a gateway node for converting a received MAP message obtaining a secured MAP message, and for extracting an unencrypted MAP message from a secured MAP message.

FIG. 2 depicts an architecture of a gateway node for converting a received MAP message obtaining a secured MAP message, and for extracting an unencrypted MAP message from a secured MAP message. The gateway node comprises a MAP protocol instance SMAPPI, which is adapted to process secured and unsecured MAP messages. The MAP protocol instance SMAPPI comprises a protocol machine for generating and answering to secured and unsecured MAP messages. The MAP protocol instance SMAPPI communicates with a TCAP (transaction capabilities application part) protocol instance TCAPPI and with a MAP user protocol-instance MAPUPI by exchanging appropriate service data units. The MAP user protocol instance MAPUP is connected to an operation and maintenance unit OMU that provides operation and maintenance for the gateway node. The TCAP protocol instance TCAPPI is further connected to a SCCP (Signaling Connection Control Part) protocol instance SCCPPI. The SCCP protocol instance SCCPPI is connected to other network nodes on which MAP protocol instances are implemented for communicating using unsecured MAP messages via the Zf interface ZFI. Furthermore the SCCP protocol instance SCCPPI is connected to other network nodes on which MAP protocol instances are implemented for communicating using unsecured MAP messages via a network interface NI.

The MAP protocol instance SMAPPI is connected to a cryptography unit CU, that is adapted to encrypt a MAP message obtaining a secured MAP message. Furthermore the cryptography unit CU is adapted to decrypt a secured MAP message for obtaining content of a respective unencrypted MAP message. The cryptography unit CU is connected to a key exchange unit KEU for being provided with keys for encryption and keys for decryption. The key exchange unit KEU is connected to other network nodes that perform an administration of encryption and decryption keys via a Zd interface ZDI. The key exchange unit KEU is connected to a policy management unit PMU, that coordinates the negotiation of protection profiles and security associations for secure communication channels.

The policy management unit PMU is connected to a security policy database SPD and a security association database SAD for obtaining information needed for the negotiation of the protection profiles. In the security policy database SPD security policies to be applied for a secure communication channel are stored. Information on a level of security indicated for a particular domain can be stored in a security domain information unit SDIU and provided to the policy management unit PMU in a negotiation of a security policy. In a preferable embodiment a security policy to be applied towards a particular domain of the communication network can be configured independently from a configuring of a security policy towards another domain. A security policy can comprise an indicating whether MAP application layer security is to be applied towards a domain, an indicating whether unsecured transmission of MAP messages is allowed or an indicating that no communication using MAP messages is allowed towards a particular domain. A security policy can also comprise the security mechanisms, such as encryption or integrity protection to be applied towards a particular domain.

Potential policies to be applied towards a domain can be preconfigured and stored as potential protection profiles in the security policy database SPD. In the negotiation of a protection profile to be applied towards a domain the policy management unit PMU can access the security database SPD to request a preconfigured protection profile. When a protection profile has been negotiated by the policy management unit PMU, security information to be used in a secure communication towards a domain is exchanged between the policy management unit PMU and a security database in that domain. Security information can comprise an encryption or a decryption key and an indication for an algorithm to be used in an encryption or a decryption. Security information is grouped in security associations and stored in the security association database SAD.

A database administration unit DAU is connected to the security policy database SPD and the security association database SAD such that the security policy database SPD and the security association database SAD can be administrated by the database administration unit DAU.

The database administration unit DAU and the security domain information unit IKEA can be controlled and configured using a user interface unit UI advantageously comprising a graphical user interface or a device for command line interpretation.

The MAP protocol instance SMAPPI is connected to a fallback store FBS that stores for a particular domain an indication that a fallback to a lower level of security than the configured level of security for the particular domain is allowable. In a preferable embodiment of the invention the allowing of the fallback to the lower level of security is configurable for one domain independently from an allowing of a respective fallback to a lower level of security for another domain.

If an unencrypted MAP message or a secured MAP message compliant to a lower level of security than the preconfigured level of security for the domain from that the secured MAP message was sent is received in the MAP protocol instance SMAPPI, the MAP protocol instance SMAPPI can check the fallback store FBS whether a fallback to a lower level of security is allowed towards that domain. If a fallback to a lower level of security is allowed towards the domain, the MAP message can be processed according to a level of security to which a fallback is allowed.

Figure 3:
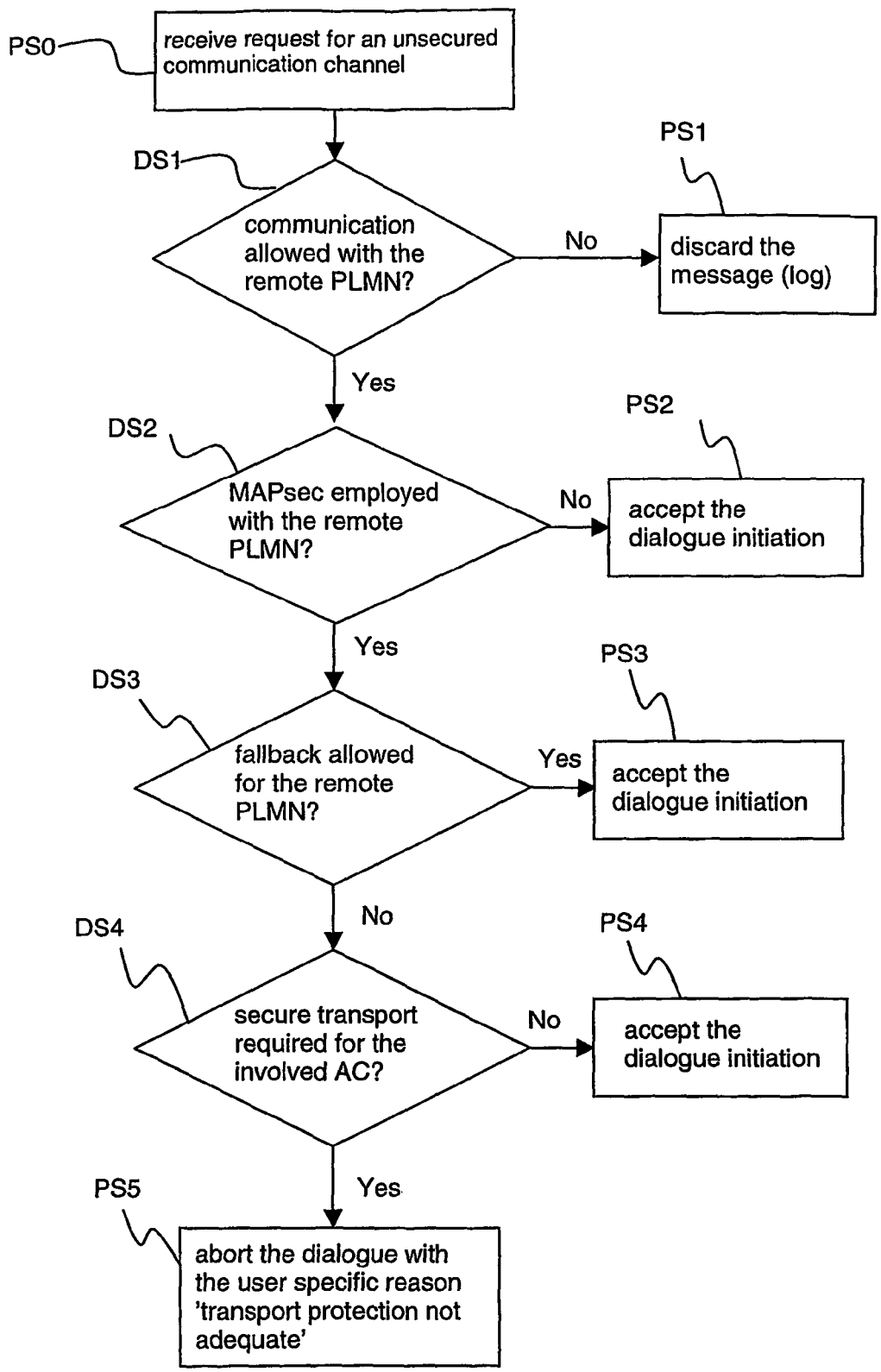
FIG. 3 depicts a flow chart comprising decision steps and processing steps that are performed during a set up of a secure communication channel.

FIG. 3 depicts a sequence of decision steps and processing steps to be performed by a gateway node when a request for an unsecured communication channel using the MAP protocol is received in the gateway node. The decision steps described preferably comprise a querying to a security database comprised in or connected to the gateway node. When the request for the dialogue initiation for the unsecured communication channel is received in the gateway node in an initiating processing step PS0, the gateway node performs in a first decision step DS1 a check, whether a communication is allowed towards the domain from which the request was issued. If a communication is not allowed, the request is discarded and logged by the gateway node in a first processing step PS1.

If a communication is allowed towards the domain from which the request was received, the gateway node performs in a second decision step DS2 a check, whether an applying of MAP application layer security is mandatory according to a preconfigured level of security for a communication towards the domain that issued the request for the dialogue initiation. If an applying of MAP application layer security is not mandatory, the dialogue initiation is accepted in a second processing step PS2.

If an applying of MAP application layer security is mandatory according to a preconfigured level of security, the gateway node performs in a third decision step DS3 a check, whether a fallback to a lower level of security than the preconfigured level is allowed towards the domain from which the request was received. If a fallback to a lower level of security is allowed towards the domain, the dialogue initiation is accepted in a third processing step PS3.

If a fallback to a lower level of security is not allowed, the gateway node performs in a fourth decision step DS4 a check, whether a secured transmission channel is mandatory for the type of message to which the dialogue initiation referred. If a secured transmission channel is not mandatory for type of message, the dialogue initiation is accepted in a fourth processing step PS4.

If a secured transmission channel is mandatory for the type of message to which the dialogue initiation referred, the dialogue is aborted in a fifth processing step PS5. The aborting of the dialogue advantageously comprises an outputting of reason for the aborting of the dialogue. The reason for the aborting advantageously specifies that a transport protection is not adequate for the type of message.

What is claimed is:

1. A telecommunication network system having at least a gateway node, with a first domain comprising:
a mobile application part protocol instance connected to the gateway node configured to send and receive mobile application part messages in accordance with the 3rd Generation Partnership Project (3GPP) Technical Specification (TS) 3&200, the gateway node being connected to a second domain, wherein the gateway node is configured to receive a mobile application part message from the first domain, to convert the received mobile application part message obtaining a secured mobile application part message, and to: send the obtained message to the second domain, the gateway node further being configured to receive a secured mobile application part message from the second domain, to extract an unsecured mobile application part message from the received secured mobile application part message and to send the extracted message to the first domain, where a secured mobile application part message is obtained by security mechanisms comprising one or more of data encryption and data integrity protection applied toward a particular domain.

2. The telecommunication network according to claim 1, wherein the gateway node is connected to a third domain and wherein the gateway node performs a selective discarding of mobile application part messages received from the first domain and destined for the third domain and a selective discarding of mobile application part messages received from the third and destined for the first domain.

3. The telecommunication network according to claim 1, wherein the gateway node performs as a firewall to the third domain.

4. The telecommunication network according to claim 1 wherein the gateway node is connected to different domains, and levels of security are configurable for the different domains.

5. The telecommunication network according to claim 1 wherein for a particular domain a fallback to a lower level of security than the configured level of security for the particular domain is allowable and allowing the fallback to the lower level of security is configurable for one domain independently from a configuring of an allowing of a respective fallback to a lower level of security level for another domain.

6. A gateway node comprising an interface to a first domain of a telecommunication network for sending and receiving mobile application part messages in accordance with the 3rd Generation Partnership Project (3GPP) Technical Specification (TS) 33.200, comprising:
an interface to a second domain of the telecommunication network for sending and receiving secured mobile application part messages wherein the gateway node further comprises a conversion unit that is adapted to receive a mobile application part message via the interface to the first domain, to convert the received mobile application part message obtaining a secured mobile application part message, and to send the obtained message via the interface towards the second domain, the conversion unit further being configured to receive a secured mobile application part message via the interface to the second domain, to extract an unsecured mobile application part message from the received secured mobile application part message and to send the extracted message via the interface towards the first domain, where a secured mobile application part message is obtained by security mechanisms comprising one or more of data encryption and data integrity protection applied toward a particular domain.

7. The gateway node according to claim 6, comprising an interface to a third domain for sending and receiving mobile application part messages and a filtering unit adapted to perform a selective discarding of mobile application part messages.

8. The gateway node according to claim 6, wherein the gateway node performs as a firewall to the third domain.

9. The gateway node according to claim 6, wherein the gateway node is connected to different domains, and the gateway node comprises a security database for storing indications of levels of security for the different domains.

10. The gateway node according to claim 6, further comprising
a fallback store for storing for a particular domain and an indication that a fallback to a lower level of security than the configured level of security for the particular domain is allowable, wherein allowing of the fallback to the lower level of security is configurable for one domain independently from an allowing of a respective fallback to a lower level of security for another domain.

* * * * *